US006981278B1

(12) United States Patent
Minnig et al.

(10) Patent No.: US 6,981,278 B1
(45) Date of Patent: Dec. 27, 2005

(54) SYSTEM AND METHOD FOR SECURE DUAL CHANNEL COMMUNICATION THROUGH A FIREWALL

(75) Inventors: Jeffrey T. Minnig, Flower Mound, TX (US); Glenn L. Pullen, North Richland Hills, TX (US)

(73) Assignee: Sterling Commerce, Inc., Dublin, OH (US)

( * ) Notice: Subject to any disclaimer, the term of this patent is extended or adjusted under 35 U.S.C. 154(b) by 939 days.

(21) Appl. No.: 09/655,256

(22) Filed: Sep. 5, 2000

(51) Int. Cl.[7] .......................... H04L 9/00; G06F 15/16
(52) U.S. Cl. ....................... 726/12; 713/153; 709/245; 709/246; 709/249
(58) Field of Search .............................. 709/245, 246, 709/249; 713/201; 726/12

(56) References Cited

U.S. PATENT DOCUMENTS

| 5,793,763 A | 8/1998 | Mayes et al. ............... 370/389 |
| 5,958,053 A * | 9/1999 | Denker ....................... 713/201 |
| 5,983,350 A * | 11/1999 | Minear et al. .............. 713/201 |
| 6,055,236 A * | 4/2000 | Nessett et al. .............. 370/389 |
| 6,104,716 A * | 8/2000 | Crichton et al. ............ 370/401 |
| 6,128,298 A * | 10/2000 | Wootton et al. ............ 370/392 |
| 6,154,839 A * | 11/2000 | Arrow et al. ................ 713/154 |
| 6,415,329 B1 * | 7/2002 | Gelman et al. ............. 709/245 |
| 6,708,219 B1 * | 3/2004 | Borella et al. ............. 709/245 |
| 6,751,728 B1 * | 6/2004 | Gunter et al. ............... 713/153 |
| 6,781,982 B1 * | 8/2004 | Borella et al. ............. 370/352 |
| 2004/0010712 A1 * | 1/2004 | Hui et al. ................... 713/201 |

FOREIGN PATENT DOCUMENTS

| EP | 909074 A1 * | 4/1999 | ........... H04L 29/06 |
| WO | WO 99/48261 | 9/1999 | ........... H04L 29/06 |

OTHER PUBLICATIONS

Aboba, Bernard. "NAT and IPSEC", Jul. 2000.*
Allman, M. et al. "FTP Extension for IPv6 and NATs" (RFC2428), Sep. 1998.*
Bellovin, S. "Firewall-Friendly FTP" (RFC1579), Feb. 1994.*
Borella, Michael et al. "Distributed Network Address Translation", Oct. 1998.*
Briggs, Richard. "NAT FTP (was: Iptables and ipsec)", Jul. 2000.*
Egevang, K. et al. "The IP Network Address Translator (NAT)" (FRC1631), May 1994.*
Herscovitz, Eli. "Secure Virtual Private Networks: The Future of Data Communications", 1999 John Wiley & Sons.*
Hoffman, P. "SMTP Service Extension for Secure SMTP over TLS" (RFC2487), Jan. 1999.*

(Continued)

Primary Examiner—Gregory Morse
Assistant Examiner—Michael J. Simitoski
(74) Attorney, Agent, or Firm—Baker Botts L.L.P.

(57) ABSTRACT

A server including a dual channel communications module operable to establish a communication session between the server and a client is provided. The server may be operable to receive a dual channel communication packet from the client. In a particular embodiment, the dual channel communication packet may include a header in a data payload. The header includes a client external IP address, and the data payload includes an encoded port command having a client internal IP address and a client data port number. A codec operable to decode the port command may also be provided. The server may also include a translation module for retrieving the client external IP address from the header. In a particular embodiment, the server is operable to establish data channel coordinates including the client external IP address, the client data port number, a server internal IP address and a server data port number.

20 Claims, 4 Drawing Sheets

OTHER PUBLICATIONS

Huttunen, Ari. "draft-ipsec-esp-in-udp-00.txt", Sep. 2000.*
Kent, S. et al. "Security Architecture for the Internet Protocol" (RFC2401), Nov. 1998.*
Kent, S. et al. "IP Encapsulating Security Payload (ESP)" (RFC2406), Nov. 1998.*
Microsoft. "Unicast routing overview", Feb. 2000.*
Phifer, Lisa. "IP Security and NAT: Oil and Water?", Jun. 2000.*
O'Guin, Steven et al. "Application of Virtual Private Networking Technology to Standards-Based Management Protocols Across Heterogeneous Firewall-Protected Networks", 1999 IEEE.*
Srisuresh, P. et al. "Security for IP Network Address Translator (NAT) Domains", Nov. 1998.*
Srisuresh, P. "Security Model with Tunnel-mode IPsec for NAT Domains" (RFC2709), Oct. 1999.*
Srisuresh, P. et al. "IP Network Address Translator (NAT) Terminology and Considerations" (RFC2663), Aug. 1999.*
Stallings, William. "Network Security Essentials, Applications and Standards" Nov. 1999 (Pub) Jan. 2000 (Reg).*
Stevens, W. Richard. TCP/IP Illustrated, vol. 1: The Protocols, 1994 Addison-Wesley.*
Tsirtsis, George et al. "NAT Bypass for End 2 End 'sensitive' applications", Jan. 1998.*
Baptiste et al. "Transparent Routing between Ipv4/Ipv6 Networks", Dec. 2002.*
Broadband Reports. "Security>> 3. NAT Routers" <http://www.broadbandreports.com/faq/4638>.*
Ford-Hutchinson, Paul. "FTP/TLS Friendly Firewalls", Nov., 2000, <draft-fordh-ftp-ssl-firewall-00.txt>.*
Indy Project. "How do I use FTP with SSL behind a NAT", <http://www.indyproject.org/KB/index.html?ftpsslbehindnat.htm>.*
Justin. "When NAT becomes NOT", <http://www.dslreports.com/shownews/131>.*
Kostick, Chris. "IP Masquerading with Linux", 1996.*
Lampe, Jonathan G. "MOVEit DMZ", <http://www.stdnet.com/uploads/media/MOVEit-DMZ-FTPS-NAT-Whitepaper.PDF>.*
Leledy, Ph. "FTP and NAT: solutions", Sep. 2001, <http://daemonnews.org/200109/ftpnal.html>.*
Mail-Production.com. "FTP Active and Passive Modes", <http://mail-production.com/passive.html>.*
Nystron, Thomas. "KTELNET Version 2.01", Jul. 2000.*
Oppenheimer, Priscilla. "Anallysis of the File Transfer Control Protocol (FTP)", <http://www.troubleshooting-networks.com/ftpinfo.html>.*
Phifer, Lisa. "The Trouble with NAT", Dec. 2000.*
Postel et al. "File Transfer Protocol (FTP)", Oct. 1985 <RFC 959>.*
Raz et al. "An SNMP Application Level Gateway for Payload Address Translation", Oct. 2000, <RFC 392>.*
SSH. "Forwarding FTP", <http://www.ssh.com/support/documentation/online/ssh/winhelp/32/Forwarding_FTP.html>.*
Tsirtsis et al. "Network Address Translation—Protocol Translation (NAT-PT)", Feb. 2000, <RFC 2766>.*
Wikipedia. "Network Address Translation".*
CERT. "CERT Advisory CA-1997-27 FTP Bounce", Dec. 1997, <http://www.cert.org/advisories/CA-1997-27.html>.*
Ford-Hutchinson, Paul et al. "Securing FTP with TLS", Jan. 2000, <draft-murray-auth-ftp-ssl-05.txt>.*
Hobbit. "The FTP Bounce Attack", Jul. 1995, <http://www.insecure.org/nmap/hobbit.ftpbounce.txt>.*
Housley, R. et al. "Encryption using KEA and SKIPJACK", Feb. 2000, RFC 2773.*
Internet Security System. "advICE :Intrusions: 2001323", <http://www.iss.net/security_center/advice/Intrusions/2001323/default.htm>.*
Tsuchiya, Paul F. et al. "Extending the IP Internet Through Address Reuse", ACM SIGCOMM.*
M. Norifusa, "Internet security: difficulties and solutions," *International Journal of Medical Informatics*, Elsevier Scientific Publishers, Shannon, IR, vol. 49, No. 1, Mar. 1998, XP004149463, ISSN: 1386-5056, 6 pages.
M. Leech, et al., "RFC 1928: SOCKS Protocol Version 5," *Requestion for Comments* Online, Mar. 1996, XP002198150, retrieved from Internet May, 6, 2000, 9 page, Mar. 1998.
R. Hunt, "Internet/Intranet firewall security-policy, architecture and transaction services," *Computer Communications*, Butterworths & Co. Publishers Ltd., GB, vol. 21, No. 13, Sep. 1, 1998, XP004146571, ISSN: 0141-3664, 17 pages.
"Sterling Commerce's CONNECT: Mailbox," *Software Economics Letter*, Aug. 1999, *Computer Economics, USA*, vol. 8, No. 8, XP008002282, ISSN: 1065-6146, 2 pages.
Sterling Commerce, "Connect: Mailbox and Secure FTP The Revolution is On," *Sterling Commerce White Paper* Online, Dec. 31, 1999, XP002198149, retrieved from the Internet Apr. 8, 2002, 20 pages.
PCT International Search Report in International Application No. PCT/US 01/27595, date May 31, 2002, 7 pages.

* cited by examiner

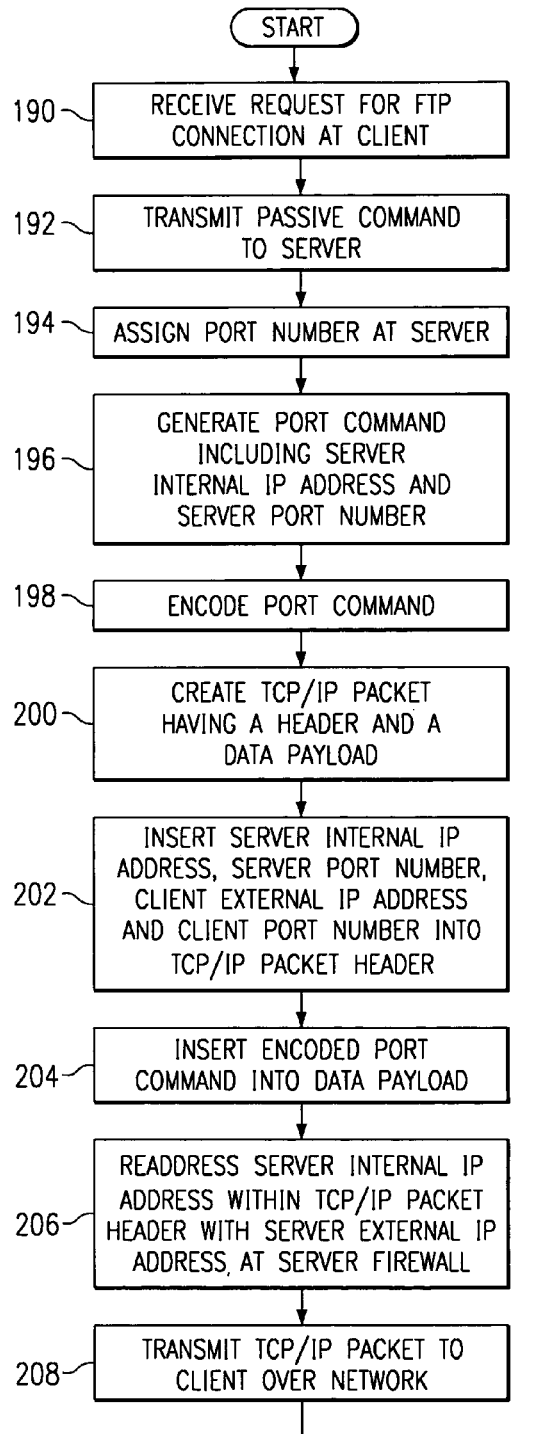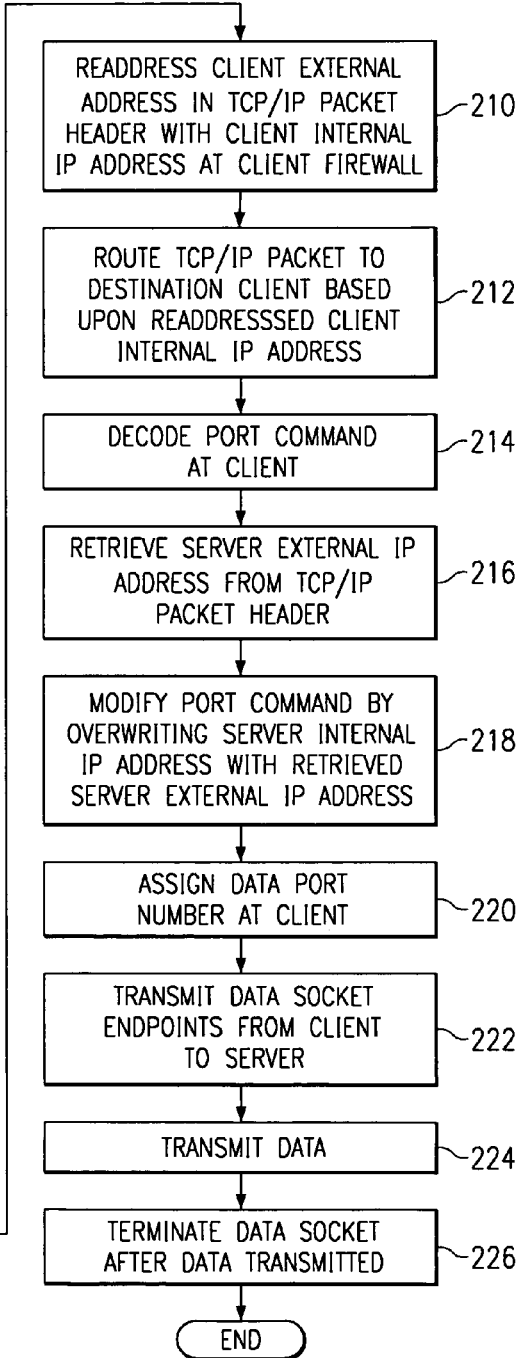
FIG. 5

SYSTEM AND METHOD FOR SECURE DUAL CHANNEL COMMUNICATION THROUGH A FIREWALL

TECHNICAL FIELD OF THE INVENTION

The present invention relates generally to the field of network communications and, more particularly to a system and method for secure dual channel communication through a firewall.

BACKGROUND OF THE INVENTION

Distributed computer networks, for example, the Internet are frequently used to transfer data and information both internally and externally to an organization. Due to the nature and sensitivity of the information being transferred, various steps are often taken to protect the information from interception through outside sources. As an example, firewalls and encryption technology may be incorporated into one or more components of the network for security purposes.

A firewall is a combination of hardware and software which limits the exposure of a computer or group of computers to an attack from outside. The most common use of a firewall is on a local area network (LAN) which is connected to the Internet. Accordingly, a firewall is a system or combination of systems that enforce a boundary between two or more networks. There are several types of firewalls including packet filter, circuit gateway, application gateway or trusted gateway. A network-level firewall, or packet filter, examines traffic at the network protocol packet level.

Encryption technology may also be incorporated into one or more components of the network. Encryption includes the transformation of data into a form unreadable by anyone without a secret decryption key. Its purpose is to ensure privacy by keeping the information from anyone for whom it is not intended. Secure sockets layer or SSL, is one type of encryption technology which may be incorporated into a computer network.

SSL is a transport level technology for authentication and data encryption between a server and a browser, or client. SSL negotiates point-to-point security between a client and a server. It sends data over a "socket", a secure channel at the connection layer existing in most TCP/IP applications. SSL is the dominant security protocol for Internet monetary transactions and communications. Information being transmitted is encrypted, and only the user's web browser and the computer server at the other end have the key, and thus the ability to understand and decipher transferred information.

A dual channel communication module may be incorporated into one or more components of the network, to facilitate the transfer of data within the network. Dual channel communication refers to any software and/or hardware which communicates using two or more channels. File Transfer Protocol (FTP), for example, uses non-transient control channels and transient data channels set up over the control channels, to establish data channels, and includes data channel address information within the data payload of packets transmitted over the control channel. When the data payload is encrypted prior to arriving at a firewall associated with a given component, the firewall is unable to decipher and translate the address information contained within the data payload. As a result, secure FTP cannot be used in crossing firewall boundaries.

SUMMARY OF THE INVENTION

The present invention provides a system and method for secure dual channel communications through a firewall that substantially eliminate or reduce the problems and disadvantages associated with previous methods and systems. In particular, client-side network address translation (NAT) is performed at the server on encrypted payload addresses, using header address information.

In accordance with a particular embodiment of the present invention, a server having a dual communications module operable to establish a communications session between the server and a client may be provided. The server is operable to receive a dual channel communication packet from the client, the dual channel communication packet including a header and a data payload. The header may include a client external IP address, and the data payload may include an encoded port command having a client internal IP address and a client data port number. The server may also include a codec operable to decode the port command. A translation module may be provided for retrieving the client external IP address from the header and replacing the client internal IP address with the client external IP address. In accordance with one embodiment of the present invention, the server is operable to establish data channel coordinates including the client external IP address, the client data port number, a server internal IP address and a server data port number.

In accordance with another aspect of the present invention, the server may include a packet filtering server firewall. In the same embodiment, the firewall may include a network address translator (NAT) including a static network address translation entry for each of the client and the server.

Technical advantages of the present invention include providing an improved system and method for secure dual channel communications. In particular, encrypted channel address information is translated to allow a secure session across firewalls. As a result, secure dual channel communications can be established across network boundaries without regard to firewall protection.

Another technical advantage of the present invention includes providing client-side network address translation of server-side addresses. In particular, addresses encrypted during transfer and network address translation on the client side using header information translated at the server side. Accordingly, information encrypted during transmission can be updated (corrected) at its destination for use in establishing a connection between the sender and the destination.

Another technical advantage of the present invention includes providing secure FTP. In particular, communications are addressed in a manner transparent to software applications running within the network.

Another technical advantage of the present invention includes providing a system and method for addressing FTP communications which requires no communication protocol changes.

Yet another technical advantage of the present invention includes a system and method for addressing FTP communications which may be installed and operated on a distributed computer network system with little to no demand on the firewall administrator.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description, taken in conjunction with the accompanying drawings, in which:

FIG. 5 is a flow diagram illustrating the alternative embodiment secure FTP communication session of FIG. 4.

DETAILED DESCRIPTION OF THE DRAWINGS

Figure 1:
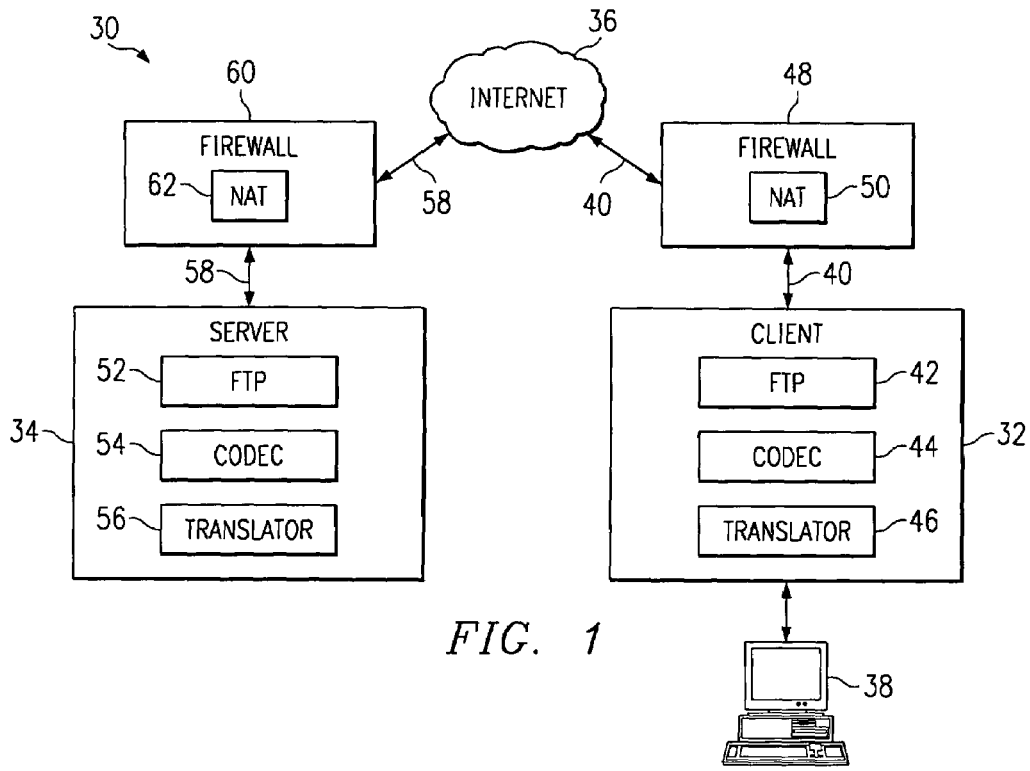
FIG. 1 is a block diagram illustrating a distributed network in accordance with one embodiment of the present invention.

FIG. 1 illustrates a computer network 30 in accordance with one embodiment of the present invention. Network 30 includes a client 32 and server 34 coupled across a public network, or the Internet 36. It will be understood that the present invention may be used in connection with other suitable computer networks and that client 32 and server 34 may be coupled across one or more networks including, but not limited to the World Wide Web, intranets, local area networks (LANs), wide area networks (WANs) or Metropolitan Area Networks (MANs).

Referring to FIG. 1, client 32 includes a user interface 38 which allows a user to access client 32. Client 32 may include any computer system or network of computers having the ability to transfer and receive data through a communications link 40. In a particular embodiment, client 32 includes File Transfer Protocol ("FTP") module 42, a codec 44 and/or a translator 46. In another embodiment, FTP module 42 may include any dual channel communication module which communicates using a dual channel protocol.

FTP module 42 is hardware and/or software which allows users to transfer text and files to and from another computer (client or server). FTP module 42 also allows a user or client 32 to list directories, delete and rename files resident on server 34, and perform wildcard transfers between client 32 and server 34. FTP may also be referred to as file transfer protocol.

With respect to the Internet, FTP is an extension of the TCP/IP protocol suite. FTP is a file-sharing protocol that operates at layers five through seven of the open systems interconnection (OSI) model.

In the illustrated embodiment, a client firewall 48 is disposed along communication link 40 between client 32 and Internet 36. Client firewall 48 forms a barrier between client 32 and Internet 36, and includes a combination of hardware and software which limits the exposure of client 32 from a security breach originating from Internet 36. Client firewall 48 may include a "network-level" firewall which examines traffic at the network protocol packet level and/or an "application level" firewall which examines traffic at the application level, for example FTP, e-mail or Web Content. As will described later in more detail, client firewall 48 also includes the ability to readdress outgoing traffic so it appears to have originated from a network external to client firewall 48, rather than client 32. This is made possible in part by a Network Address Translator 50 which resides upon firewall 48. In fact, each host (server and client) has an associated static network address translation entry on client firewall 48. The PIX™ firewall, as manufactured by Cisco Systems™, is suitable for use within the teachings of the present invention.

Similar to client 32, server 34 may also include "FTP" module 52, a codec 54 and/or a translator 56. Server 34 is coupled with Internet 36 through a communications link 58. A second, server firewall 60 is disposed along communication link 58 between server 34 and Internet 36. Server firewall 60 forms a barrier between server 34 and Internet 36, and includes a combination of hardware and software which limits the exposure of server 34 from a security breach originating from Internet 36. Firewall 60 may include a "network-level" firewall which examines traffic at the network protocol packet level and/or an "application level" firewall which examines traffic at the application level, for example FTP, e-mail or Web Content. Network Address Translator (NAT) 62 provides the ability to readdress outgoing traffic so it appears to have originated from a network external to firewall 60, rather than server 34.

Application level firewalls may also be referred to as proxying firewalls. Network level firewalls may also be referred to as packet-filtering firewalls. The teachings of the present invention are suitable for use with any packet filtering firewall.

The illustrated embodiment includes both client firewall 48 and server firewall 60. It will be recognized by those of ordinary skill in the art that the teachings of the present invention are applicable to any client/server computer network having at least one firewall associated with either the client, the server or both, and may include many more firewalls disposed throughout the system.

Figure 2:
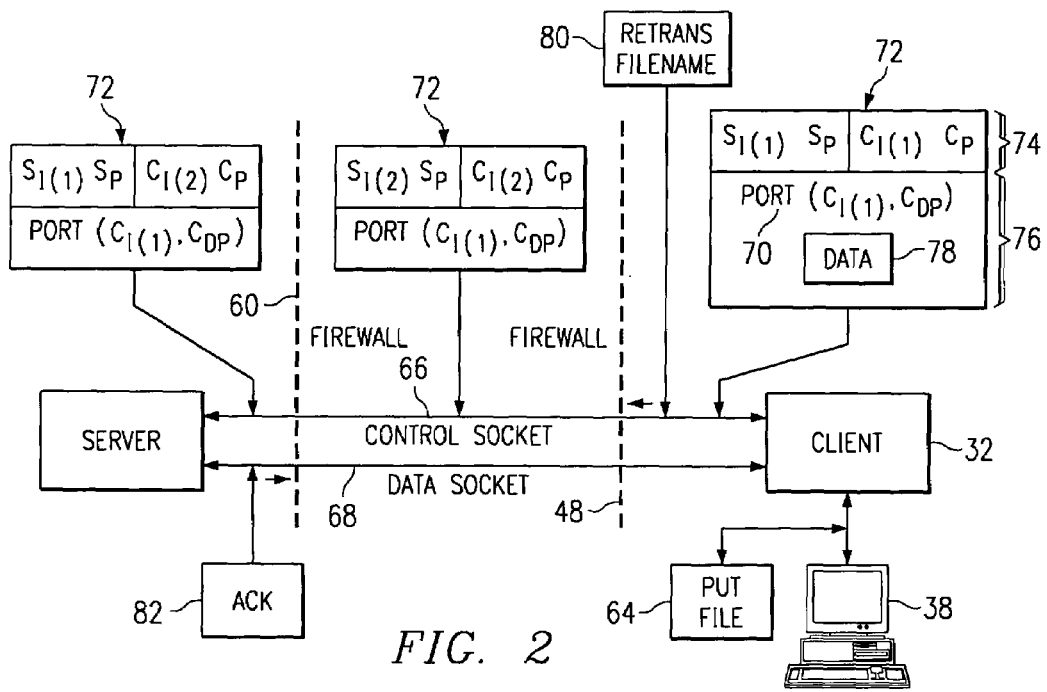
FIG. 2 is a block diagram illustrating a secure File Transfer Protocol (FTP) communication session between a server and a client of FIG. 1, in accordance with one embodiment of the present invention.

FIG. 2 illustrates a normal mode communication session between client 32 and server 34 in accordance with one embodiment of the present invention. Many types of transactions or data transfers between client 32 and server 34 are available to a user of client 32 including, but not limited to "GET FILE," "PUT FILE" or "DISPLAY DIRECTORY." For example, a user situated at user interface 38 may request to send a file to server 34 by initially sending a "PUT FILE" command 64 to client 32.

FTP communication between client 32 and server 34 is accomplished using a control socket 66 and a data socket 68. Control socket 66 is a permanent, non-transient connection established at the beginning of the FTP communication session and remains persistent throughout the entire session. Control socket 66 may also be referred to as a command socket, or control channel. In normal FTP communication mode, data socket 68 is established by server 34. Data socket 68 is a transient connection and only exists for the duration of the particular data transfer session.

Encryption technology, for example, Secure Socket Layer (SSL) technology may be incorporated into control socket 66 and data socket 68, using codecs 54 and 44, for communications between client 32 and server 34. SSL is a transport layer technology for authentication and data encryption between a client and a server. Accordingly, SSL sends data over sockets 66 and 68. This ensures that the information being transmitted is encrypted, and only client 32 and server 34 have the necessary software to understand the data sent by the other. Accordingly, if this information is intercepted from within Internet 36, or another external entity, the perpetrator is unable to understand the contents of the data packets. The teachings of the present invention may be used in systems with or without encryption technology, interchangeably.

When client 32 receives "PUT FILE" command 64 from user interface 38, client 32 creates a data socket port number $C_{DP}$ which includes a random port number selected by client 32. Codec 44 of client 32 encodes its associated client IP number $C_{I(1)}$ and data socket port number $C_{DP}$ into a port command 70. In a particular embodiment, port command 70 includes a six octet field containing the data port coordinates $C_{I(1)}$ and $C_{DP}$.

In order to accomplish FTP communication with server 34, client 32 creates a transmission control protocol ("TCP")/Internet protocol ("IP"), or TCP/IP packet 72 which includes a header 74 and a data payload 76. Header 74 includes server's 34 public IP address $S_{I(1)}$, and port number $S_p$, and client's 32 private IP address $C_{I(1)}$ and port number $C_p$, and may include other control information for TCP. In practice, $C_p$ is often assigned the number 20 and $S_p$ is often assigned the number 21. These port number selections are arbitrary, however, and may be altered at the discretion of the network administrator.

Data payload 76 includes port command 70. Additional TCP/IP packets are created by client 32 as required to transfer all of the necessary data 78 to server 34. Each additional TCP/IP packet includes, however, headers and port commands which are identical to header 74 and port command 70. For the purpose of this specification, each means every one of at least a subset of identified items.

TCP/IP packet 72 encounters firewall 48 as it travels toward server 34. Firewall 48 readdresses header 74 of TCP/IP packet 72 in order to disguise the private IP address $C_{I(1)}$ of client 32. Accordingly, firewall 48 replaces client private IP address $C_{I(1)}$ with client public IP address $C_{I(2)}$ within header 74. However, since payload 76 is encrypted, firewall 48 is unable to read and/or readdress client's 32 private IP address $C_{I(1)}$ and data port number $C_{DP}$ within payload 76.

When TCP/IP packet 72 passes through firewall 60 and arrives at server 34, NAT 62 of firewall 60 readdresses header 74 to include server's 34 private IP address $S_{I(2)}$ in lieu of server's 34 public address $S_{I(1)}$. The encrypted port command 70 includes client's 32 private IP address $C_{I(1)}$ and data port number $C_{DP}$. Server 34 decodes the encrypted payload and determines client's 32 private IP address $C_{I(1)}$ and port number $C_{DP}$, in order to establish the end point coordinates of data socket 68. However, server 34 cannot address a message to client 32 using client's 32 private IP address $C_{I(1)}$, since any message from server 34 to client 32 must necessarily pass through client firewall 48 and firewall 48 will only recognize client's 32 public IP address $C_{I(2)}$.

Therefore, server 34 executes a GETPEER command, internally, to retrieve client's 32 public IP address $C_{I(2)}$ from translator 56. Translator 56 reads $C_{I(2)}$ from header 74. GETPEER is a standard TCP command which may be used to translate the peer (client or server) socket information. Server 34 then determines the end points of data socket 68 using server's 34 private IP address $S_{I(2)}$ and data port number $S_{DP}$, and client's 32 public IP address $C_{I(2)}$ and data port number $C_{DP}$. This readdressing of the data socket coordinates may also be referred to as a protocol fix-up. This enables server 34 to create data socket 68 and transfer data to client 32 through client firewall 48. In one embodiment, server 34 creates a modified port command to replace the port command 70 within TCP/IP packet 72. The modified port command allows server 34 to establish a communication session with client 32.

Client 32 then transmits a RETRANS FILENAME command 80 across control socket 66 to server 34, which indicates the data which client 32 would like transmitted, or "put", and server 34 transmits an ACK command 82 across data socket 68 to client 32, acknowledging this request. After receiving the ACK command, client 32 sends the appropriate data containing the file client 32 would like "put" on server 34, over data socket 68. Communication between client 32 and server 34 continues in this manner until client 32 ends the session by sending an END OF FILE command. The end of file command is typically accomplished by sending a zero length TCP/IP packet from client 32 to server 34. The END OF FILE command causes data socket 68 to discontinue, and control socket 66 remains.

Figure 3:
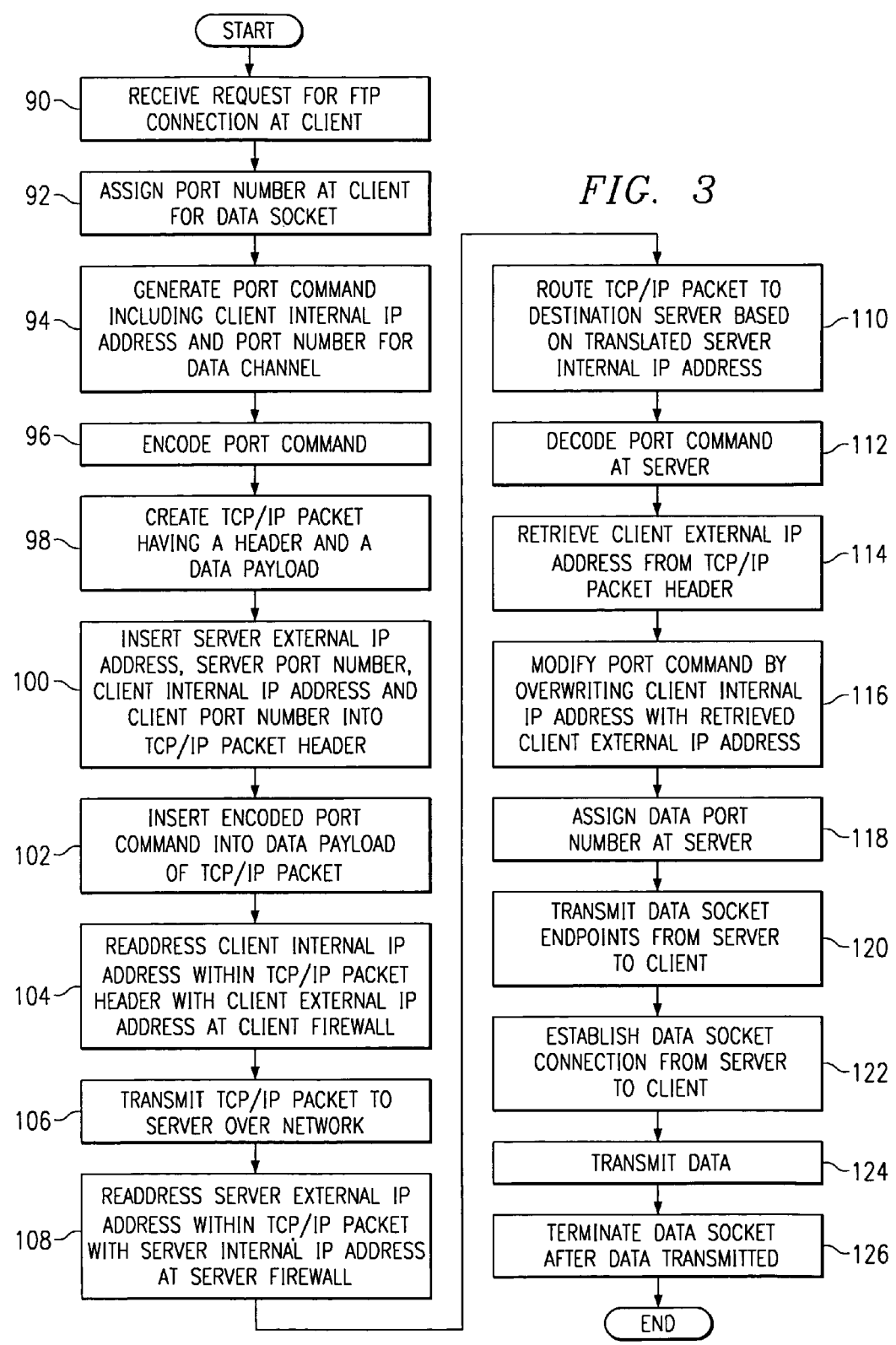
FIG. 3 is a flow diagram illustrating a method for establishing the secure FTP communication session of FIG. 2, in accordance with a particular embodiment of the present invention.

FIG. 3 is a flow diagram illustrating a method for navigating a firewall with secure FTP. The method of FIG. 3 describes the operation of a "normal" mode FTP communication session.

Referring to FIG. 3, the method begins at step 90 in which a request for an FTP communication session is received at a client. At step 92, the client assigns a port number for a data socket. Next, at step 94, the client generates a port command which includes the client's private IP address and port number for a data channel. Step 96 includes encoding the port command.

At step 98, a TCP/IP packet is created which includes a header and a data payload. Proceeding to step 100, a server's public IP address, server port number, client private IP address and client port number are inserted into the TCP/IP packet header. At step 102 the encoded port command is inserted into the data payload of the TCP/IP packet. Next, at step 104, the client private IP address within the TCP/IP header is readdressed with a client public IP address, at a firewall associated with the client. At step 106, the TCP/IP packet is transmitted to a server over the network.

Proceeding to step 108, the server public IP address within the TCP/IP packet is readdressed at a server firewall, and replaced with a server private. IP address. At step 110, the TCP/IP packet is routed to the destination server based on the translated server internal IP address. Next, at step 112, the server decodes the port command.

Proceeding to step 114, the server translator retrieves the client public IP address from the TCP/IP packet header. At step 116, the server generates a modified port command by overriding the client private IP address with the retrieved client public IP address. Next, at step 118, the server assigns a data port number. Step 120 includes transmitting the data socket end points from the server to the client. At step 122, a data socket connection is established between the server and the client. At step 124, data is transmitted over the data socket. Finally, at step 126, the data socket is terminated after data is transmitted.

As previously discussed, the method of FTP communication described above may be referred to as "normal" FTP communications. In another embodiment, the firewall(s) associated with a client/server network may be configured such that they will not allow the server to establish a data socket with the client. Accordingly, another method of FTP communication may be established, referred to as a "passive" FTP communication session. In the "passive" mode, the server establishes the data port. In contrast, the client establishes the data port in "normal" mode.

Figure 4:
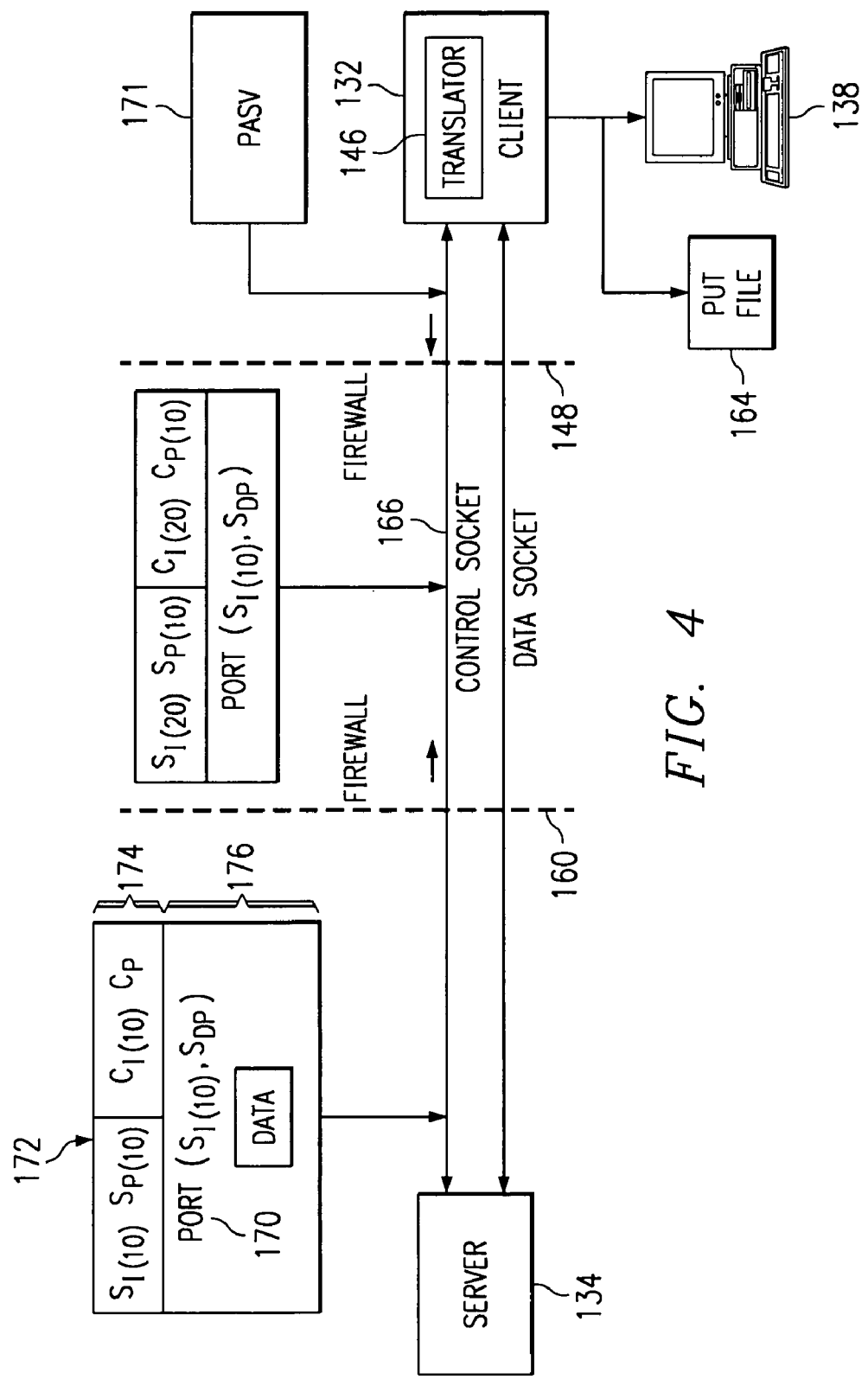
FIG. 4 is a block diagram illustrating an alternative embodiment secure FTP communication session.

A particular FTP communication session between a client 132 and a server 134, utilizing a "passive" mode, is illustrated in FIG. 4. One or more firewalls may be disposed between client 132 and server 134. For example, in the illustrated embodiment, client firewall 148 and server firewall 160 protect client 132 and server 134, respectively, from outside attack. Firewalls 148 and 160 may be configured and function similar to firewalls 48 and 60 described above.

In the passive mode, a user of user interface 138 may request to "PUT FILE" at server 134. When client 132 receives the PUT FILE command, client 132 transmits a PASV command 171 to server 134 which indicates to server 134 that FTP communications will take place in the "passive mode". Server 134 then creates a data socket port number $S_{DP}$, which may include a random port number selected by server 134. Server 134 encodes its private IP address $S_{I(10)}$ and data socket port number $S_{DP}$ into a port command 170. In the passive mode, port command 170 may also be referred to as the PASV RESPONSE.

In order to accomplish FTP communications with client 132, server 134 creates a TCP/IP packet 172 which includes a header 174 and data payload 176. Header 174 includes server's private IP address $S_{I(10)}$ and port number $S_p$ and client's public IP address $C_{I(10)}$ and port number $C_p$, and may include other control information for TCP. Data payload 176 includes port command 170 and any additional data 178 to be transferred from client 132 to server 134. TCP/IP packet 172 is then transmitted from server 134 to client 132 across control socket 166. Additional TCP/IP packets are created by server 134 as required to transfer all of the necessary data to client 132.

TCP/IP packet 172 encounters firewall 160 as it travels toward server client 132. Firewall 160 readdresses TCP/IP packet 172 in order to disguise the private IP address $S_{I(10)}$ of server 134. Accordingly, firewall 160 replaces server's 134 private IP address $S_{I(10)}$ with a corresponding public IP address $S_{I(20)}$. However, since payload 176 is encrypted, firewall 160 is unable to read and/or readdress server's private IP address $S_{I(10)}$ within port command 170 of payload 176.

TCP/IP packet 172 then passes through firewall 148 and arrives at client 132 having a port command which includes server's 134 private IP address $S_{I(10)}$. Client 132 decodes the encrypted payload 176 and determines server's 134 private IP address $S_{I(10)}$ and port number $S_p$, and establishes the end point coordinates of data socket 168. However, client 132 cannot address a message to server 134 using server's 134 private IP address $S_{I(10)}$, since any message from client 132 to server 134 must necessarily pass through server firewall 160.

Therefore, client 132 executes a GETPEER command, internally, and translator 146 establishes server's 134 public IP address $S_{I(20)}$ from header 174. Client 132 then calculates the end points of data socket 168 using server's 134 public IP address $S_{I(20)}$ and port number $S_p$ and client's 132 private IP address $C_{I(10)}$ and port number $C_p$. This enables client 132 to create data socket 168 and transfer data to server 134 through server firewall 160. Once data socket 160 has been established between client 132 and server 134, communication between client 132 and server 134 proceeds as described above with respect to client 32 and server 34.

FIG. 5 is a flow diagram illustrating a method for navigating the firewall with secure FTP. The method of FIG. 5 describes the operation of a "passive" mode FTP communication session.

Referring to FIG. 5, the method begins at step 190 where a request for an FTP connection is received at a client. At step 192, the client transmits a passive command to a server. At step 194 the server assigns a port number. Next, at step 196, the server generates a port command including a server internal IP address and server port number. At step 198, the port command is encoded.

Proceeding to step 200, the server creates a TCP/IP packet having a header and a data payload. At step 202, a server internal IP address, server port number, client external IP address, and client port number are inserted into the TCP/IP packet header. Next, at step 204, the encoded port command is inserted into the data payload.

Proceeding to step 206, the server private IP address within the TCP/IP packet letter is readdressed with a server public IP address at a firewall associated with the server. At step 208, the TCP/IP packet is transmitted to the client over the network. Next, at step 210, the client external address in the TCP/IP packet is readdressed with the client internal address, at the client firewall. At step 212, the TCP/IP packet is routed to the destination client based upon the readdressed client private IP address.

Proceeding to step 214, the port command is decoded at the client. At step 216, the client retrieves the server's public IP address from the TCP/IP packet header. Next, at step 218, the client generates a modified port command by overriding the server private IP address with the retrieved server public IP address. At step 220, the client assigns a client data port number.

Proceeding to step 222, the data socket end points are transmitted from the client to the server. At step 224, data is transmitted between the client and the server. Finally, at step 226, the data socket is terminated after data is transmitted.

The teachings of the present invention may be incorporated into any system which includes a protocol that publishes control information as part of the data socket (any dual channel protocol). There are no custom requirements of the firewall required to incorporate the system described herein. Furthermore, this system will work with any suitable network, with or without encryption technology.

Although the present invention has been described with several embodiments, various changes and modifications may be suggested to one of ordinary skill in the art. It is intended that the present invention encompass such changes and modifications as fall within the scope of the appended claims.

What is claimed is:

1. A server comprising:
   a communications module operable to receive a dual communication packet from a client over a first channel, the dual communication packet including a header having a client external IP address and a data payload having an encrypted port command having a client internal IP address and a client data port number;
   a codec operable to decrypt the encrypted port command;
   a translation module operable to retrieve the client external IP address from the header and to generate a modified port command including the external IP address; and
   the server operable to establish a second channel based on the modified port command.

2. The server of claim 1, further comprising a packet filtering server firewall.

3. The server of claim 2, further comprising a network address translator associated with the server firewall, the network address translator operable to include a static network address translation entry for each of the client and the server.

4. The server of claim 1, further comprising a file transfer protocol (FTP) communication module wherein the communication session between the server and the client over the second channel is conducted in secure FTP.

5. The server of claim 1, wherein the codec is operable to decrypt based on secure socket layer (SSL) encryption technology.

6. A client, comprising:
   a communications module operable to receive a communication packet from a server over a first channel, the communication packet including a header having a server external IP address and a data payload having an encrypted port command having a server internal IP address and a server data port number;
   a codec operable to decrypt the encrypted port command;
   a translation module operable to retrieve the server external IP address from the header and to generate a modified port command including the external IP address; and
   the server operable to establish a second channel based on the modified port command.

7. The client of claim 6, further comprising a packet filtering client firewall.

8. The client of claim 7, further comprising a network address translator associated with the client firewall, the network address translator operable to include a static network address translation entry for each of the client and the server.

9. The client of claim 6, further comprising a file transfer protocol (FTP) communication module wherein a communication session between the server and the client over the second channel is conducted in secure FTP.

10. The client of claim 6, wherein the codec is operable to decrypt based on secure socket layer (SSL) encryption technology.

11. A method for establishing a data socket between first and second peers, comprising:
   receiving an IP Packet from the first peer, the IP packet including a header and a port command;
   the header including a first peer IP address and the port command including an encrypted second peer IP address;
   decrypting the encrypted second peer IP address;
   retrieving the first peer IP address from the header;
   generating a modified port command including the first peer address in place of the second peer IP address; and
   using the modified port command to establish a data socket between the first and second peers.

12. A method for establishing a transient channel over a non-transient channel, comprising:
   receiving an IP packet over the non-transient channel, the IP packet including a header and a port command;
   the header including a first peer IP address and the port command including an encrypted second peer IP address;
   decrypting the encrypted second peer IP address;
   retrieving the first peer IP address from the header;
   generating a modified port command including the first peer IP address in place of the second peer IP address; and
   using the modified port command to establish the transient channel between a server and a client.

13. A computer readable medium encoded with a computer program operable to:
   receive an IP packet from a first peer, the IP packet including a header and a port command;
   the header including a first peer IP address and the port command including an encrypted second peer IP address;
   decrypt the encrypted second peer IP address;
   retrieve the first peer IP address from the header;
   generate a modified port command including the first peer IP address in place of the second peer IP address;
   establish a data socket between the first peer and a second peer using the modified port command.

14. A method for establishing a data socket between a server and a client, comprising:
   encrypting a port command including a client internal IP address and a client port number;
   generating a dual channel communication packet having a header and a data payload, the header including a server external IP address, server port number, the client internal IP address and the client port number;
   the data payload including the encrypted port command;
   transmitting the communication packet between the server and the client;
   decrypting the encrypted port command;
   retrieving a client external IP address from the header;
   modifying the decrypted port command by overriding the client internal IP address within the decrypted port command with the client external IP address retrieved from the header; and
   establishing a data socket between the server and the client using the modified decrypted port command.

15. The method of claim 14, further comprising readdressing the client internal IP address within the header with the client external IP address, at a client firewall.

16. The method of claim 14, further comprising readdressing the server external IP address within the header with a server internal IP address at a server firewall.

17. A method for establishing a data socket between a server and a client, comprising:
   transmitting a passive command to the server;
   encrypting a port command including a server private IP address and a server port number;
   creating a dual channel communication packet having a header and a data payload, the header including a client external IP address, client port number, a server internal IP address and the server port number;
   the data payload including the encrypted port command;
   transmitting the communication packet to the client;
   decrypting the encrypted port command;
   retrieving a server external IP address from the header;
   modifying the decrypted port command by overriding the server internal IP address within the decrypted port command with the server external IP address retrieved from the header; and
   establishing a data socket between the server and the client using the modified decrypted port command.

18. The method of claim 17, further comprising readdressing the server internal IP address within the header with the server external IP address at a server firewall.

19. The method of claim 17, further comprising readdressing the client external IP address in the header with a client internal IP address, at a client firewall.

20. A method for transferring information over an external network, comprising:
   establishing a control channel between a server and a client;
   identifying a first end point at a first one of the server and the client, the first end point including a first portion and a second portion;
   encrypting the first end point in a secure format;
   encapsulating the encrypted first end point in a transmission packet including an address header having the private address of the first end point;

translating the private address in the address header into a public address for transmitting over the external network;
transmitting the transmission packet over the external network in the control channel;
receiving the transmission packet at the other one of the client and the server;
decrypting the encrypted first end point; and
modifying the end point by replacing the first portion in the decrypted end point with the public address in the address header, and establishing a data channel between the client and the server using the modified end point.

* * * * *